(12) United States Patent
Nakano et al.

(10) Patent No.: US 10,616,058 B2
(45) Date of Patent: Apr. 7, 2020

(54) DATA CONFIGURATION SYSTEM, DATA UPDATE SYSTEM, AND DATA CONFIGURATION METHOD

(71) Applicant: ICOM INCORPORATED, Osaka-shi, Osaka (JP)

(72) Inventors: Akira Nakano, Osaka (JP); Yuma Oda, Osaka (JP)

(73) Assignee: ICOM INCORPORATED, Osaka-shi, Osaka (JP)

( * ) Notice: Subject to any disclaimer, the term of this patent is extended or adjusted under 35 U.S.C. 154(b) by 0 days.

(21) Appl. No.: 15/762,279

(22) PCT Filed: Nov. 18, 2016

(86) PCT No.: PCT/JP2016/084202
§ 371 (c)(1),
(2) Date: Mar. 22, 2018

(87) PCT Pub. No.: WO2017/086416
PCT Pub. Date: May 26, 2017

(65) Prior Publication Data
US 2018/0324037 A1    Nov. 8, 2018

(30) Foreign Application Priority Data
Nov. 18, 2015 (JP) .................. 2015-225984

(51) Int. Cl.
*H04L 12/24* (2006.01)
*H04L 29/08* (2006.01)
(Continued)

(52) U.S. Cl.
CPC ............ *H04L 41/082* (2013.01); *G06F 13/00* (2013.01); *H04L 67/34* (2013.01); *H04M 11/00* (2013.01); *H04W 8/24* (2013.01)

(58) Field of Classification Search
CPC ........ G06F 13/00; H04L 41/082; H04L 67/34; H04M 11/00; H04W 8/24
See application file for complete search history.

(56) References Cited

U.S. PATENT DOCUMENTS

2002/0136222 A1* 9/2002 Robohm ................ H04L 12/14
370/395.31
2007/0100957 A1 5/2007 Bhogal
(Continued)

FOREIGN PATENT DOCUMENTS

JP 2015-090694 A 5/2015
WO 2017/006833 A1 1/2017

OTHER PUBLICATIONS

"IP Transceiver System IP-500H" by Icom Incorporated [online], <URL: https://www.icom.co.jp/products/land_mobile/products/ip_transceiver/IP500H/index.html>, retrieved on Mar. 7, 2018, which is discussed on p. 1-2 of the specification.
(Continued)

Primary Examiner — Kevin C. Harper
Assistant Examiner — Derrick V Rose
(74) Attorney, Agent, or Firm — Muncy, Geissler, Olds & Lowe, P.C.

(57) ABSTRACT

[Problem] To smoothly update configuration data comprising: fixed data set to a server by an administrator; and data rewritable by a user at a terminal.
[Solution] A terminal device having a storage unit that stores configuration data, and a first and a second provisioning server are connected over a network. The terminal device includes an operation unit for rewriting variable data, which is a part of the plurality of configuration data. The first provisioning server stores all the configuration data. The second provisioning server stores fixed data, which is the plurality of configuration data excluding the variable data. The terminal device accesses the first provisioning server in
(Continued)

an initial state in order to obtain all the configuration data and store the same in the storage unit. The configured terminal device accesses the second provisioning server in order to obtain the fixed configuration data.

12 Claims, 11 Drawing Sheets

(51) Int. Cl.
*H04W 8/24* (2009.01)
*G06F 13/00* (2006.01)
*H04M 11/00* (2006.01)

(56) References Cited

U.S. PATENT DOCUMENTS

2010/0146085 A1* 6/2010 Van Wie ............... H04L 12/00
709/220
2010/0311391 A1* 12/2010 Siu ....................... H04W 8/205
455/411

OTHER PUBLICATIONS

International Search Report of PCT/JP2016/084202.
The extended European search report of the corresponding EP application No. 16866416.7 dated Sep. 13, 2019.
The partial supplementary European search report of the corresponding EP application No. 16866416 dated May 29, 2019.

* cited by examiner

| REMOTE CONFIGURATION DEVICE 1 TERMINAL IDENTIFICATION INFORMATION (ICCID) | PROVISIONING SERVER A1 ADDRESS |
|---|---|
| | PROVISIONING SERVER B1 ADDRESS |
| | CALL CONTROLLER 1 ADDRESS |
| REMOTE CONFIGURATION DEVICE 2 TERMINAL IDENTIFICATION INFORMATION (ICCID) | PROVISIONING SERVER A2 ADDRESS |
| | PROVISIONING SERVER B2 ADDRESS |
| | CALL CONTROLLER 2 ADDRESS |

Fig. 7A

| COMMUNICATION TERMINAL 1 TERMINAL IDENTIFICATION INFORMATION (ICCID) | PROVISIONING SERVER A1 ADDRESS |
|---|---|
| COMMUNICATION TERMINAL 2 TERMINAL IDENTIFICATION INFORMATION (ICCID) | |
| COMMUNICATION TERMINAL 3 TERMINAL IDENTIFICATION INFORMATION (ICCID) | |
| COMMUNICATION TERMINAL 4 TERMINAL IDENTIFICATION INFORMATION (ICCID) | PROVISIONING SERVER A2 ADDRESS |
| COMMUNICATION TERMINAL 5 TERMINAL IDENTIFICATION INFORMATION (ICCID) | |

Fig. 7B

| TERMINAL IDENTIFICATION INFORMATION (ICCID) | COMMON DATA | INDIVIDUAL DATA |
|---|---|---|
| TERMINAL IDENTIFICATION INFORMATION (ICCID) | | INDIVIDUAL DATA |
| TERMINAL IDENTIFICATION INFORMATION (ICCID) | | INDIVIDUAL DATA |

Fig. 8A

| TERMINAL IDENTIFICATION INFORMATION (ICCID) | COMMON DATA | INDIVIDUAL FIXED DATA | INDIVIDUAL VARIABLE DATA |
|---|---|---|---|
| TERMINAL IDENTIFICATION INFORMATION (ICCID) | | INDIVIDUAL FIXED DATA | INDIVIDUAL VARIABLE DATA |
| TERMINAL IDENTIFICATION INFORMATION (ICCID) | | INDIVIDUAL FIXED DATA | INDIVIDUAL VARIABLE DATA |

Fig. 8B

| TERMINAL IDENTIFICATION INFORMATION (ICCID) | ACTIVE FLAG |
|---|---|
| TERMINAL IDENTIFICATION INFORMATION (ICCID) | ACTIVE FLAG |
| TERMINAL IDENTIFICATION INFORMATION (ICCID) | ACTIVE FLAG |

Fig. 8C

| | INITIAL STATE | INITIAL CONFIGURATION | PRO A | PRO B | CLONING TERMINAL OPERATION |
|---|---|---|---|---|---|
| INITIAL CONFIGURATION SERVER ADDRESS | ▓ | | | | |
| RESTART FLAG | | ▓ | ▓ | | |
| PROVISIONING SERVER ADDRESS | | A | | B | |
| CALL CONTROLLER ADDRESS | | | ▓ | ▓ | |
| TRANSMISSION/ RECEPTION PORT NUMBER | | | ▓ | ▓ | |
| CALL ID | | | ▓ | ▓ | |
| NOTIFICATION SOUND SETTING | | | ▓ | | ▓ |
| OPTION BUTTON SETTING | | | ▓ | | ▓ |
| EARPHONE SETTING | | | ▓ | | ▓ |
| ADDRESS BOOK | | | ▓ | | ▓ |
| VOLUME SETTING | | | ▓ | | ▓ |

REMOTE CONFIGURATION

Fig. 9

DATA CONFIGURATION SYSTEM, DATA UPDATE SYSTEM, AND DATA CONFIGURATION METHOD

TECHNICAL FIELD

The present invention relates to a data configuration system, a data update system, and a data configuration method which allows a user to update data of a server while security is maintained.

BACKGROUND ART

A voice communication system, in which a server (a call controller) is installed on a network and voice communication is conducted via this server, is put into practice (Non-Patent Literature 1, for example). In such voice communication system, a second server (provisioning server) is installed on the network in order to configure data for defining an operation of a communication terminal having a shape of a transceiver. When the communication terminal is powered on, the communication terminal is connected to the network and makes an access to the provisioning server, downloads configuration data (provisioning data) from the provisioning server and stores it in a memory (provisioning processing). The communication terminal is capable of PTT communication via the call controller using this data.

In the voice communication system, a plurality of the communication terminals are possessed by users of the system (a business enterprise using a communication service, for example), but the call controller or the provisioning server is managed by an provider of the system (a provider of the communication system). Individual provisioning data is configured in each of the plurality of communication terminals. The configuration of a part of or the whole of the communication terminal may need to be changed during an operation of the voice communication system.

Conventionally, an access path to the server and authority to update the configuration data have not been provided or given to the system user in order to maintain security of the voice communication system. That is, the system user could not update the configuration data of the user-owned communication terminal by accessing the server. Thus, the system provider has written the configuration data of all the communication terminals of the system users in the provisioning server. The writing of the configuration data in the provisioning server was also needed at a change of the configuration in addition to start of the operation of the voice communication system.

CITATION LIST

Non-Patent Literature

[Non-Patent Literature 1] "IP Transceiver System IP-500H" by Icom Incorporated [online], [searched on Nov. 4, 2015, Internet <URL: https://www.icom.co.jp/products/land_mobile/pro ducts/ip_transceiver/IP500H/index.html>

Problems to be Solved by Invention

In the aforementioned operation form, the system user needed to contact and request the system provider to change the configuration even an insignificant change every time. Then, the system provider needed to change the configuration even the insignificant change for the system user. Thus, application of the configuration change took time, and a rapid change of the operation form could not be made. For the system provider, a work is incurred at each configuration change, which increases an operation management cost of the system.

If the system user is permitted to update the configuration data in order to handle aforementioned problem, the system user could have accessed another system and have rewrited the data as a plurality of systems might be in operation on the network.

Moreover, although a part of the configuration data (such as a sound volume, for example) can be changed by a terminal user by operating the communication terminal, if the aforementioned provisioning processing for downloading all the configuration data from the provisioning server is executed when the power is on, the data changed by the user is also overwritten and returns to an initial value.

It is the object of this invention to provide a data configuration system, a data update system, and a data configuration method which can prevent configuration and update of data in an unnecessary range and can execute appropriate data configuration and update in a system in which a terminal device configuring a large quantity of data or a plurality of individual voice communication systems are operating.

SUMMARY OF INVENTION

A data configuration system of the present invention has a terminal device having a storage unit for storing configuration data including a fixed data and a variable data, and a first and a second provisioning servers communicable with the terminal device over a network. The terminal device has an operation unit for rewriting variable data. The first provisioning server stores all the configuration data. The second provisioning server stores fixed data excluding the variable data. The terminal device accesses the first provisioning server in an initial state in order to obtain all the configuration data and store it in the storage unit. The configured terminal device accesses the second provisioning server in order to obtain the fixed configuration data.

In a data configuration method of the present invention, in a system having a terminal device having a storage unit for storing the configuration data including the fixed data and the variable data, and the first and the second provisioning servers communicable with the terminal device over a network, all the configuration data is stored in the first provisioning server, and fixed data excluding predetermined variable data is stored in the second provisioning server. The terminal device accesses the first provisioning server in an initial state in order to obtain all the configuration data so that the terminal device is made to be configured, and the configured terminal device accesses the second provisioning server in order to obtain the fixed configuration data.

In the data configuration system of the present invention, the terminal device accesses the first provisioning server and obtains all the configuration data in the initial state. In the configured terminal device, the variable data can be changed by an operation by the operation unit. Thus, the configured terminal device accesses the second provisioning server and obtains only the fixed data. As a result, update of the configuration data consisting of the fixed data configured in the provisioning server by an administrator and the variable data rewritable by the user in the terminal is executed smoothly, respectively, whereby the fixed data is kept the latest at all times, and the variable data configured by the user is not overwritten.

The data update system of the present invention has a provisioning server provided in each of the plurality of voice communication systems and a remote configuration device for accessing the provisioning server of any one of the voice communication systems in order to update data of the accessed provisioning server, and moreover, an initial configuration server for specifying the provisioning server to which the remote configuration device should make an access is provided. The remote configuration device accesses the initial configuration server at startup and accesses the provisioning server specified by this initial configuration server.

In the data update system of the present invention, when the plurality of voice communication systems is in operation, the initial configuration server specifies to which server of the system the remote configuration device for updating the data of the provisioning server of this voice communication system should access. As a result, the remote configuration device does not freely access the server of another system.

Advantageous Effect of Invention

According to the present invention, in the system in which the terminal device configures a large quantity of data or a plurality of individual voice communication systems are in operation, configuration of data and update in an unnecessary range can be prevented, and appropriate data configuration and update can be performed.

BRIEF DESCRIPTION OF DRAWINGS

FIG. 7A is a diagram illustrating a system allocation table provided in an initial configuration server.

FIG. 7B is a diagram illustrating the system allocation table provided in the initial configuration server.

FIG. 8A is a diagram illustrating tables provided in a provisioning server and a call controller.

FIG. 8B is a diagram illustrating tables provided in the provisioning server and the call controller.

FIG. 8C is a diagram illustrating tables provided in the provisioning server and the call controller.

FIG. 9 is a diagram illustrating from which server the provisioning data of the communication terminal is written.

DETAILED DESCRIPTION OF THE EMBODIMENT

Figure 1:
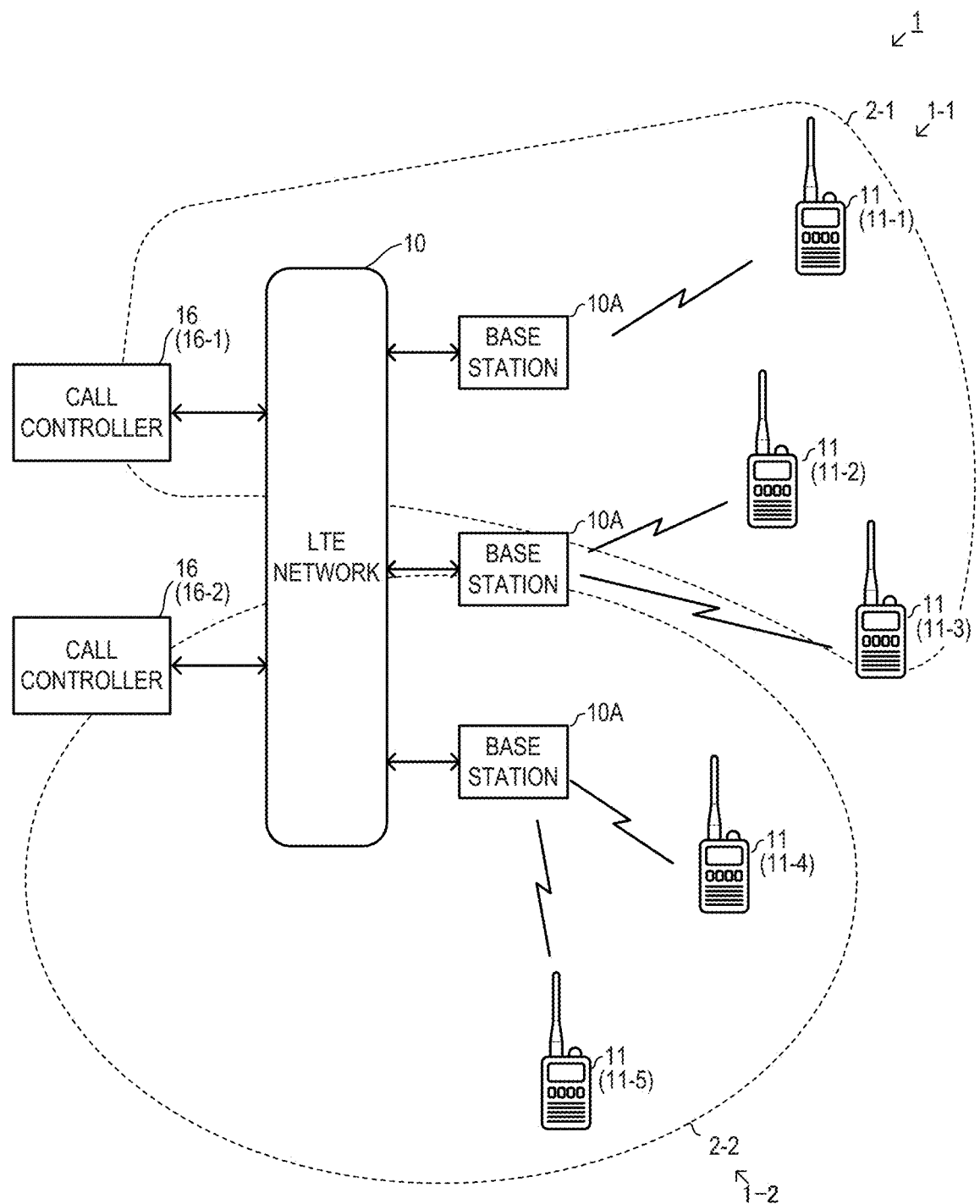
FIG. 1 is a configuration diagram of a call control system of a voice communication system which is an embodiment of the present invention.
Figure 4:
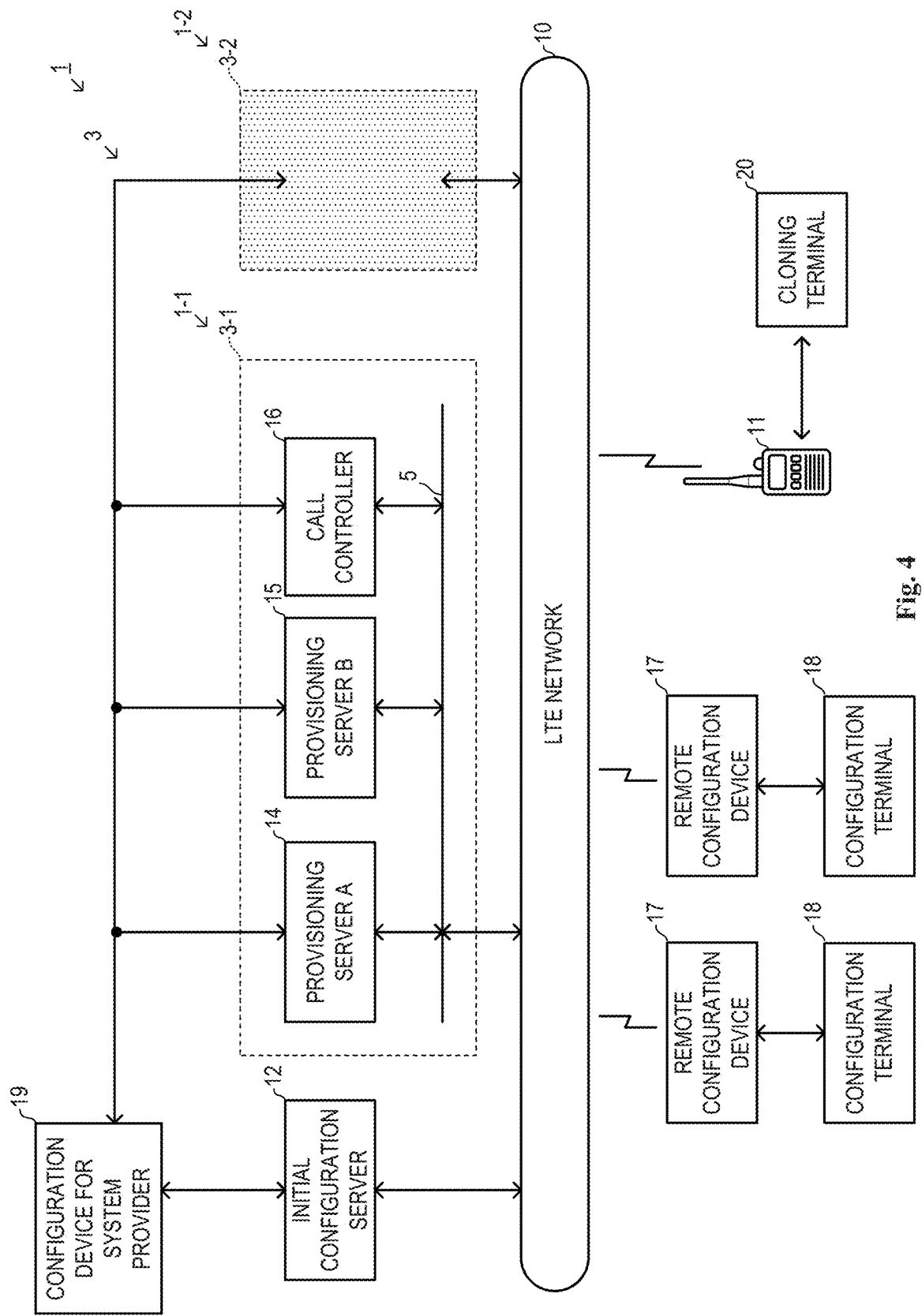
FIG. 4 is a configuration diagram of a terminal configuration system of the voice communication system.

A voice communication system of this invention will be described by referring to the attached drawings. FIG. 1 is a configuration diagram of a call control system 2 of the voice communication system which is an embodiment of this invention. FIG. 4 is a configuration diagram of a terminal configuration system 3 of the voice communication system. This voice communication system 1 includes two individual voice communication systems 1-1 and 1-2, and each of the voice communication systems 1-1 and 1-2 has call control systems 2-1 and 2-2 and terminal configuration systems 3-1 and 3-2, respectively. In the present invention, the number (n) of the individual voice communication systems 1-n is not limited.

In FIG. 1, in the call control system 2-1, communication terminals 11-1, 11-2, and 11-3 conduct voice communication with each other via a call controller 16-1. In the call control system 2-2, the communication terminals 11-4 and 11-5 conduct voice communication with each other via a call controller 16-2. In the present invention, the number of the communication terminals 11 belonging to each of the voice communication systems is not limited. An LTE network 10 which is a communication network for a mobile phone is used as a communication infrastructure between a call controller 16 and the communication terminal 11. The LTE network 10 has a base station 10A which is a wireless communication base. The communication terminal 11 accesses the LTE network 10 by communicating with the base station 10A. In the present invention, the call controller 16 and various servers 12, 13, 14, and 15 illustrated in FIG. 4 are installed in a closed network to which a free access cannot be made. In the present invention, the communication infrastructure is not limited to the LTE network.

Figure 2:
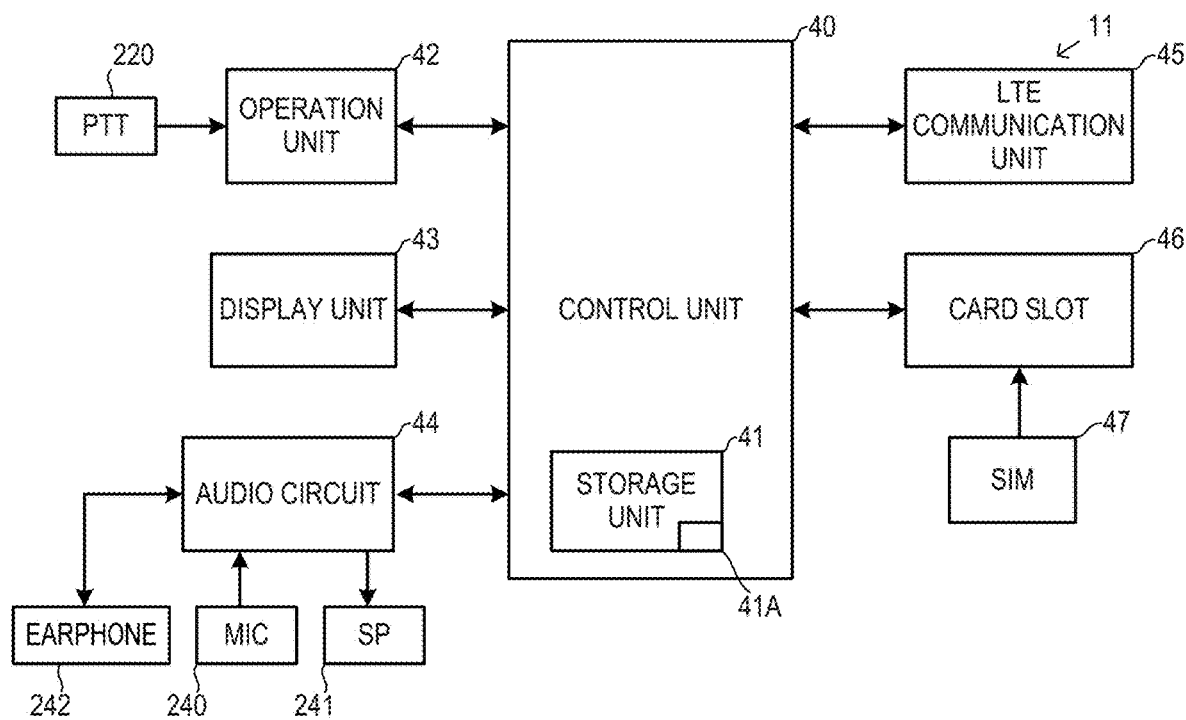
FIG. 2 is a block diagram of a communication terminal.
Figure 3:
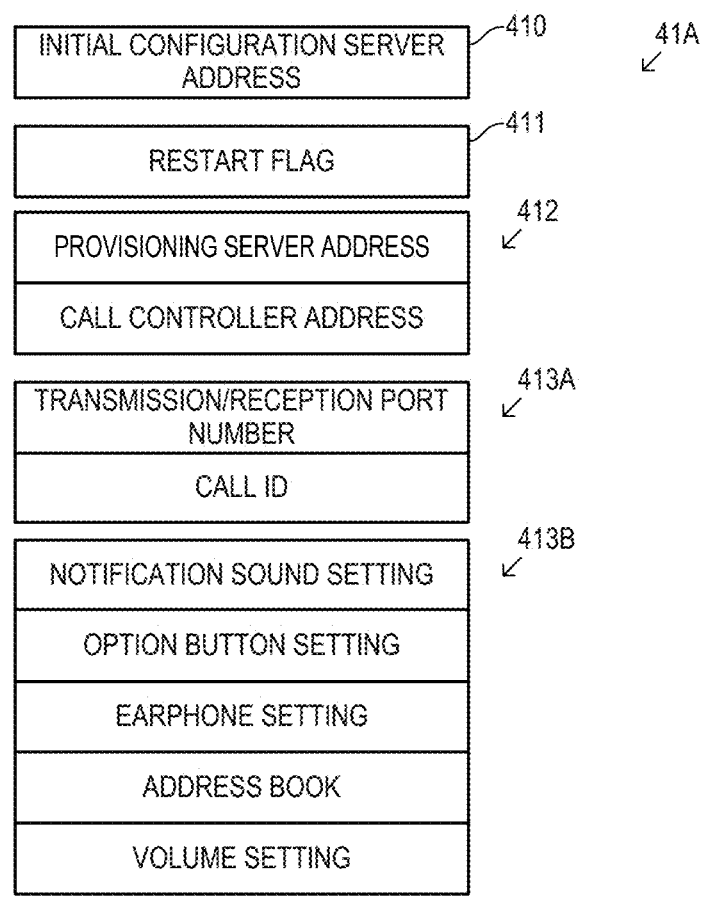
FIG. 3 is a diagram illustrating provisioning data configured in the communication terminal.

FIG. 2 is a block diagram of the communication terminal 11. The communication terminal 11 has an appearance of a handy transceiver as illustrated in FIG. 1, but functionally, it is a wireless network device which transmits/receives a voice signal via the base station 10A of the LTE network 10. A control unit 40 for controlling an operation of the device is constituted by a microprocessor. The control unit 40 has a storage unit 41 in which various types of data is stored. The storage unit 41 has a provisioning data storage area 41A. In the provisioning data storage area 41A, provisioning data (configuration data) as illustrated in FIG. 3 is stored. An operation unit 42, a display unit 43, an audio circuit 44, an LTE communication unit 45, and a card slot 46 are connected to the control unit 40. The operation unit 42 includes a key switch such as a PTT switch 220 and receives an operation by the user and inputs its operation signal to the control unit 40. The display unit 43 includes a liquid crystal display. The liquid crystal display displays an identification number of a communication partner selected by the user's operation or the identification number of the communication partner whose incoming call was received.

The audio circuit 44 has a microphone 240 and a speaker 241. The control unit 40 decodes the received voice signal and inputs it to the audio circuit 44. The audio circuit 44 converts this decoded audio signal to an analog signal and outputs it from the speaker 241. Moreover, the audio circuit 44 converts the voice signal input from the microphone 240 to a digital signal and inputs it to the control unit 40. The control unit 40 makes this digital audio signal into a voice packet and inputs it to an LTE communication unit 45. The LTE communication unit 45 has a circuit for conducting wireless communication in an LTE communication mode and transmits the packet input from the control unit 40 toward the base station 10A and inputs a packet received from the base station 10A to the control unit 40. It should be noted that an earphone connector 242 is provided in the audio circuit 44. When an earphone microphone (not shown)

is connected to the earphone connector 242, the microphone 240 and the speaker 241 provided in the communication terminal 11 body stop their functions, and a microphone and a speaker (earphone) of the earphone microphone are enabled. An IC card (SIM card) 47 storing terminal identification information is set in the card slot 46. The terminal identification information (ICCID) stored in this SIM card 47 is used as identification information of each of the communication terminals 11. A module in which the terminal identification information (ICCID) is written may be incorporated instead of the SIM card 47.

When the user inputs voice toward the microphone 240 while pressing the PTT switch 220 by using the communication terminal 11 configured as above, the communication terminal 11 edits this voice signal into a voice packet and transmits it to the call controller 16 via the base station 10A.

FIG. 3 is a diagram illustrating configuration of the provisioning data storage area 41A of the storage unit 41. In the provisioning data storage area 41A, the provisioning data as below is stored. It should be noted that, in this embodiment, an initial configuration server address in the following data is written non-volatility at shipment of the communication terminal 11 and is not included in the provisioning data.

Initial configuration server address: IP address of an initial configuration server 12 illustrated in FIG. 4

Provisioning server address: IP address of a provisioning server A 14 or a provisioning server B 15 illustrated in FIG. 4

Call controller address: IP address of call controller 16

Transmission/reception port number: Transmission/reception port number for communicate with a call controller 16.

Call ID: Call ID of the communication terminal 11 itself

Notification sound setting: Selection information of notification sound for an incoming call or the like Option button setting: Assignment information of functions to option buttons provided in the operation unit 42

Earphone setting: Setting information whether or not full duplex communication is to be conducted when the earphone microphone is connected Address book: Call ID list of communication terminals 11 which can be called Volume setting: Volume setting information of communication voice In the aforementioned data, the provisioning server address and the call controller address are data 412 common in the communication terminals 11 used in the same individual voice communication system. The call ID, the transmission/reception port number, the notification sound setting, the option button setting, the earphone setting, the address book, and the volume setting are individual data 413 set individually for each of the communication terminals 11. Among them, the call ID and the transmission/reception port number are individual fixed data 413A which is unique to each of the communication terminals 11 and cannot be changed from the communication terminal 11. The notification sound setting, the option button setting, the earphone setting, the address book, and the volume setting which are provisioning data other than the above are individual variable data 413B which can be changed by the operation of the communication terminal 11 by the user or by a cloning terminal 20 (see FIG. 4) connected to the communication terminal 11. The types and the numbers of the common data 412, the individual fixed data 413A, and the individual variable data 413B are not limited to those in this embodiment.

FIG. 4 is a diagram illustrating configuration of the terminal configuration system 3 for writing the provisioning data in the communication terminal 11. The terminal configuration system 3 also has two terminal configuration systems 3-1 and 3-2 corresponding to the two call control systems 2-1 and 2-2. Since the terminal configuration systems 3-1 and 3-2 have the similar configuration, the terminal configuration system 3-1 will be described below.

A provisioning server A 14-1, a provisioning server B 15-1, and the aforementioned call controller 16-1 are installed correspondingly to the voice communication system 1-1. Each of the servers and the controllers are connected to the LTE network 10. The initial configuration server 12 is provided in common in the plurality of voice communication systems 1. It should be noted that the provisioning server A 14-1, the provisioning server B 15-1, and the call controller 16-1 may be directly connected to the LTE network 10 or may be connected to a local area network 5 connected to the LTE network 10 via a gateway (not shown).

The communication terminal 11 conducting the voice communication accesses the initial configuration server 12 in the initial state, that is, at shipment from a factory or at initialization and is allocated to the voice communication system 1-*n* to which it belongs. That is, the communication terminal 11 obtains an address of the provisioning server A 14-*n* of the voice communication system 1-*n* to which it belongs and obtains the provisioning data to be operated in the voice communication system 1-*n*. In the call control system 2-1, the provisioning server A 14-1 transmits all the provisioning data to the communication terminal 11 in the initial state. The provisioning server B 15-1 resets only the fixed data in the provisioning data with respect to the configured communication terminal 11. The communication terminal 11 which obtained the provisioning data accesses the call controller 16-1 and requests registration (registration of the fact that it is in operation). The communication terminal 11 become capable of communicating with the other communication terminals 11 as a device belonging to the call control system 2-1 illustrated in FIG. 1 by being registered in the call controller 16-1.

A table illustrated in FIGS. 7A and 7B are stored in the initial configuration server 12. A table as illustrated in FIGS. 8A, 8B, and 8C is stored in the provisioning server A 14, the provisioning server B 15, and the call controller 16, respectively. Configuration of these tables are provided by a configuration device for the system provider 19, that is, by the system provider. Contents of the tables are written by the configuration device for the system provider 19 or the remote configuration device 17.

A client (a system user such as a business enterprise operating the voice communication system by having users (employees) holding a plurality of the communication terminals 11, respectively) can update the data in the provisioning server A 14, the provisioning server B 15, and the call controller 16 by using the remote configuration device 17. The system administrator of the client inputs the update data to the remote configuration device 17 by using a configuration terminal 18. The remote configuration device 17 updates the data by transmitting this data to the specified server and controller. The remote configuration device 17 is configured as illustrated in FIG. 5, and the configuration terminal 18 is configured by a personal computer, for example.

The user of the communication terminal 11 can rewrite the individual variable data by operating the operation unit 42 of the communication terminal 11. The user can also rewrite the individual variable data more efficiently by connecting the cloning terminal 20 to the communication terminal 11 by a cable. The cloning terminal 20 is configured by a personal computer, for example.

Figure 5:
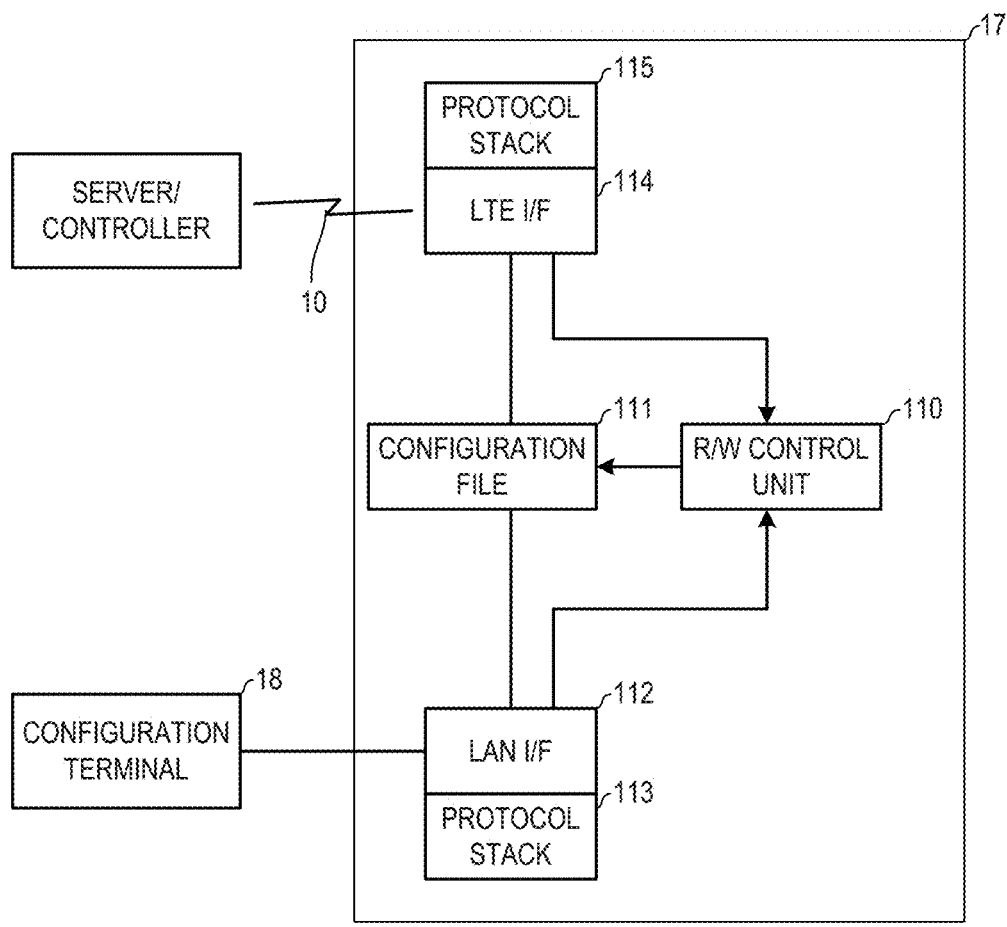
FIG. 5 is a block diagram of a remote configuration device.

FIG. 5 is a block diagram of the remote configuration device 17. The remote configuration device 17 connects the configuration terminal 18 to the server and the controller on the LTE network 10. The remote configuration device 17 has a LAN interface 112 communicating with the remote configuration device 17, an LTE interface 114 communicating with each server over the LTE network 10, an R/W control unit 110, and a configuration file storage unit 111.

The LAN interface 112 has a protocol stack 113 for communicating with the configuration terminal 18. This protocol stack 113 may be those for executing a protocol conforming to a general LAN standard. Moreover, the LTE interface 114 has a protocol stack 115 for communicating with each server over the LTE network 10. This protocol stack 115 conforms to a standard of the LTE network 10. The configuration file storage unit 111 stores update data for updating the provisioning data in each server. The R/W control unit 110 controls read/write to the configuration file storage unit 111.

As described above, the LAN interface 112 side and the LTE interface 114 side share the configuration file storage unit 111 but they are configured not to relay communication, and the configuration terminal 18 cannot directly transmit a command to the LTE network 10 side. On the other hand, since it is configured that the configuration terminal 18 is invisible from the LTE network 10 side, the configuration terminal 18 is not accessed from the LTE network 10.

Figure 6:
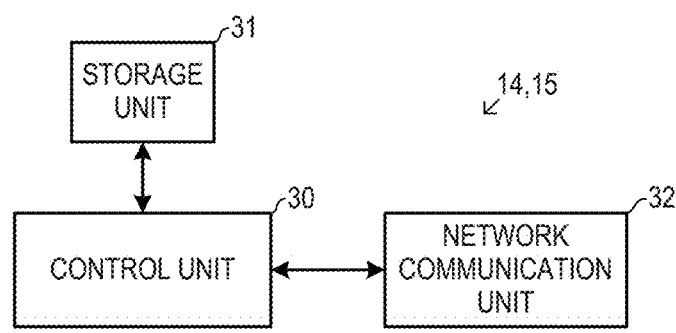
FIG. 6 is a block diagram of a server of the voice communication system.

FIG. 6 is a block diagram of the initial configuration server 12 and the provisioning servers A and B (hereinafter referred to simply as a server). The server has a control unit 30, a storage unit 31 and a network communication unit 32. The storage unit 31 is composed of a hard disk or a RAM, for example, and stores various tables illustrated in FIGS. 7A, 7B, 8A, 8B, and 8C. The network communication unit 32 communicates with the communication terminal 11 and the remote configuration device 17 over the LTE network 10. The control unit 30 obtains the provisioning data from the remote configuration device 17 by the communication over the LTE network 10 and stores it in the storage unit 31. The control unit 30 transmits the provisioning data stored in the storage unit 31 to the communication terminal 11 which made an access over the LTE network 10.

FIGS. 7A and 7B are diagrams illustrating system allocation tables provided in the initial configuration server 12. FIG. 7A is a table for allocating the remote configuration device 17. In association with each of the remote configuration devices 17 (identification information), an address of the server of the voice communication system 1-$n$ which is made to belong to the remote configuration device 17 is stored. That is, the remote configuration device 17 which should belong to the voice communication system 1-1 is associated with the addresses of the provisioning server A 14-1, the provisioning server B 15-1, and the call controller 16-1. As the identification information of the remote configuration device 17, an ICCID which is an ID for communication on the LTE network 10 may be used. The ICCID may be also used as the identification information of the communication terminal 11.

At each power on, the remote configuration device 17 accesses the initial configuration server 12 and obtains the server address of the voice communication system 1-$n$ to which it belongs, whereby data update becomes possible only to the server of the voice communication system 1-$n$.

FIG. 7B is a system allocation table for allocation the communication terminals 11 to the voice communication system 1-$n$ to which they belong, respectively. The communication terminal 11 accesses the provisioning server A 14-1 and obtains all the provisioning data and becomes operable as the communication terminal 11 of the voice communication system 1-$n$ and thus, this table stores the address of the provisioning server A 14-$n$ of the voice communication system 1-$n$ to which the communication terminal 11 is made to belong in, association with the identification information of each of the communication terminals 11.

When the communication terminal 11 is powered on in the initial state, the communication terminal 11 accesses the initial configuration server 12 and obtains the address of the provisioning server A 14-$n$. Then, the communication terminal 11 is restarted and accesses the provisioning server A 14-$n$ and obtains the provisioning data matching the voice communication system 1-$n$. The communication terminal 11 which has obtained all the provisioning data once (which has been configured) directly accesses the provisioning server B 15-$n$ at the subsequent power on without accessing the initial configuration server 12.

The system allocation table of the initial configuration server 12 illustrated in FIGS. 7A and 7B is updated by using the configuration device for the system provider 19 by the system provider. When the system provider installs the voice communication system 1-$n$ (the provisioning server A 14-$n$, the provisioning server B 15-$n$, the call controller 16-$n$) for the client and delivers the communication terminal 11 and the remote configuration device 17, the communication terminal 11 and the remote configuration device 17 can be made devices which exclusively access only the voice communication system 1-$n$ by configuration this system allocation table.

FIGS. 8A, 8B, and 8C are diagrams illustrating examples of tables provided in the storage units 31 of the provisioning server A 14, the provisioning server B 15, and the call controller 16, respectively.

FIG. 8A is a diagram illustrating a provisioning data table provided in the storage unit 31 of the provisioning server A 14-$n$. All the provisioning data which should be configured in the terminal device 11 is stored correspondingly to each of the communication terminals 11 belonging to its own voice communication system 1-$n$. The provisioning data includes the common data 412 and the individual data 413 as described above, and this table stores all the provisioning data.

FIG. 8B is a diagram illustrating a provisioning data table provided in the storage unit 31 of the provisioning server B 15-$n$. This provisioning data table stores the common data 412 and the individual fixed data 413A in the individual data 413 of each of the communication terminals 11 but does not store the individual variable data 413B. The provisioning server B 15 performs provisioning of the configured communication terminal 11, but it performs provisioning only of the individual fixed data 413A in the individual data 413 so as not to overwrite the individual variable data 413B updated by the user at this time.

FIG. 8C is a diagram illustrating a terminal table of the call controller 16-$n$. The terminal table stores a list of the communication terminals 11 belonging to this voice communication system 1-$n$ and an active flag of each of the communication terminals 11. When the communication terminal 11 accesses the call controller 16 and requests registration, the call controller 16-$n$ sets an active flag corresponding to the communication terminal 11 and stores the fact that the communication terminal 11 is in operation. As a result, transmission/reception of the voice signal with this communication terminal 11 is enabled.

Installation of these tables per se and preset of all the data are performed by the system provider. The data excluding the server address, the call controller address, and the port number can be configured by the client by using the remote configuration device 17. Moreover, the individual variable data 413B can be changed by the user himself/herself by rewriting the storage unit 41A of the communication terminal 11 without going via the server.

FIG. 9 is a diagram for explaining which data is to be configured (written) by each server in the provisioning data storage area 41A of the communication terminal 11. In the initial state (at shipment from the factory or at initialization), only the initial configuration address is stored. When the communication terminal 11 accesses the initial configuration server 12, the address of the provisioning server A 14 is written by the initial configuration server 12 in a column of the provisioning server address, and a restart flag is set. When the restarted communication terminal 11 accesses the provisioning server A 14, all the provisioning data is written by the provisioning server A 14, and the provisioning server address column is rewritten to the address of the provisioning server B 15. In this state, the communication terminal 11 is made to be configured. Then, in order to start the operation, the restart flag is set.

When the configured communication terminal 11 is powered on (restarted), it accesses the provisioning server B 15. The provisioning server B 15 writes the common data 412 and the individual fixed data 413A in the provisioning data to the communication terminal 11. The individual variable data 413B is not overwritten since it is likely to be changed by the user. It should be noted that the individual variable data 413B can be rewritten by the operation of the communication terminal 11 or configuration by the cloning terminal 20 after the communication terminal is made to be configured.

Figure 10:
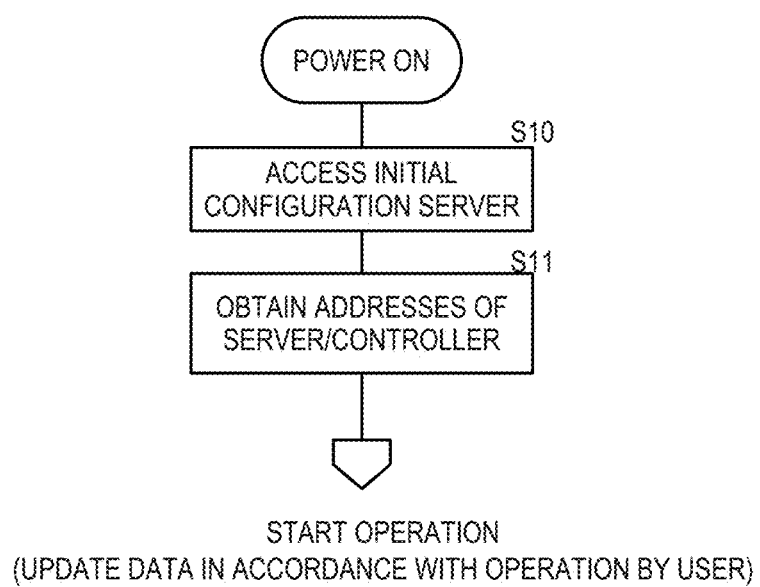
FIG. 10 is a flowchart illustrating an operation at startup of the remote configuration device.

FIG. 10 is a flowchart illustrating an operation at start of the remote configuration device 17. When the remote configuration device 17 is powered on, it accesses the initial configuration server 12 (S10). The initial configuration server 12 reads the identification information of the remote configuration device 17 which made the access and replies addresses of the various servers and controllers of the voice communication system 1-n to which this remote configuration device 17 belongs on the basis of this identification information. The remote configuration device 17 obtains the addresses of the various servers and controllers (S11). Since the remote configuration device 17 obtains the addresses of the servers and controllers, it can access these servers and controllers so as to update the data in accordance with the operation by the operator via the configuration terminal 18.

Figure 11:
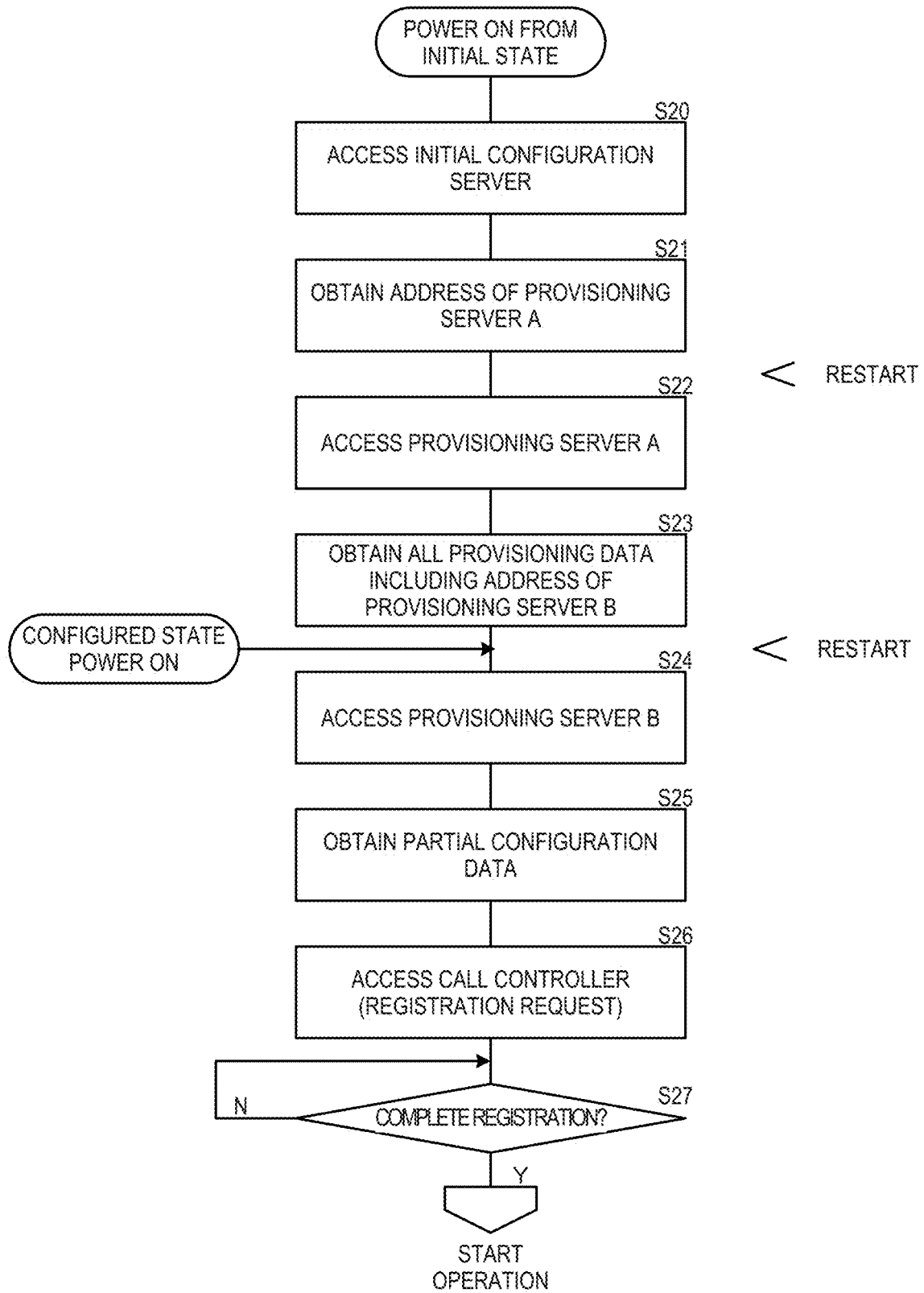
FIG. 11 is a diagram for describing a procedure of data configuration of the communication terminal.

FIG. 11 is a diagram illustrating a configuration procedure from the initial state of the communication terminal 11. When the communication terminal device 11 is powered on, it accesses the initial configuration server 12 (S20) and obtains the address of the provisioning server A 14 (S21). The communication terminal 11 is restarted by an instruction of the initial configuration server 12 and accesses the provisioning server A 14 (S22). The communication terminal 11 obtains all the provisioning data from the provisioning server A 14 (S23). This data includes the address of the provisioning server B 15. The communication terminal 11 is restarted by the instruction of the provisioning server A 14 and accesses the provisioning server B 15 (S24). The provisioning server B 15 resets only the common data 412 and the individual fixed data 413A to the communication terminal 11 (S25). The communication terminal 11 accesses the call controller 16 and requests registration (S26). When a notice of registration completion comes from the call controller 16 (S27), the operation is enabled.

The communication terminal 11 which has been powered off once or the communication terminal 11 which was restarted starts the operation at S24 and accesses the provisioning server B 15. By means of this access, the common data 412 and the individual fixed data 413A are reset. As a result, even if the provisioning data stored in the provisioning server B 15 is changed by the remote configuration device 17 before power is turned on, the change can be reflected in the configuration of the communication terminal 11. Even in this case, since the user might have individually changed the configuration of the communication terminal 11, the individual variable data 413B is not overwritten.

Figure 12:
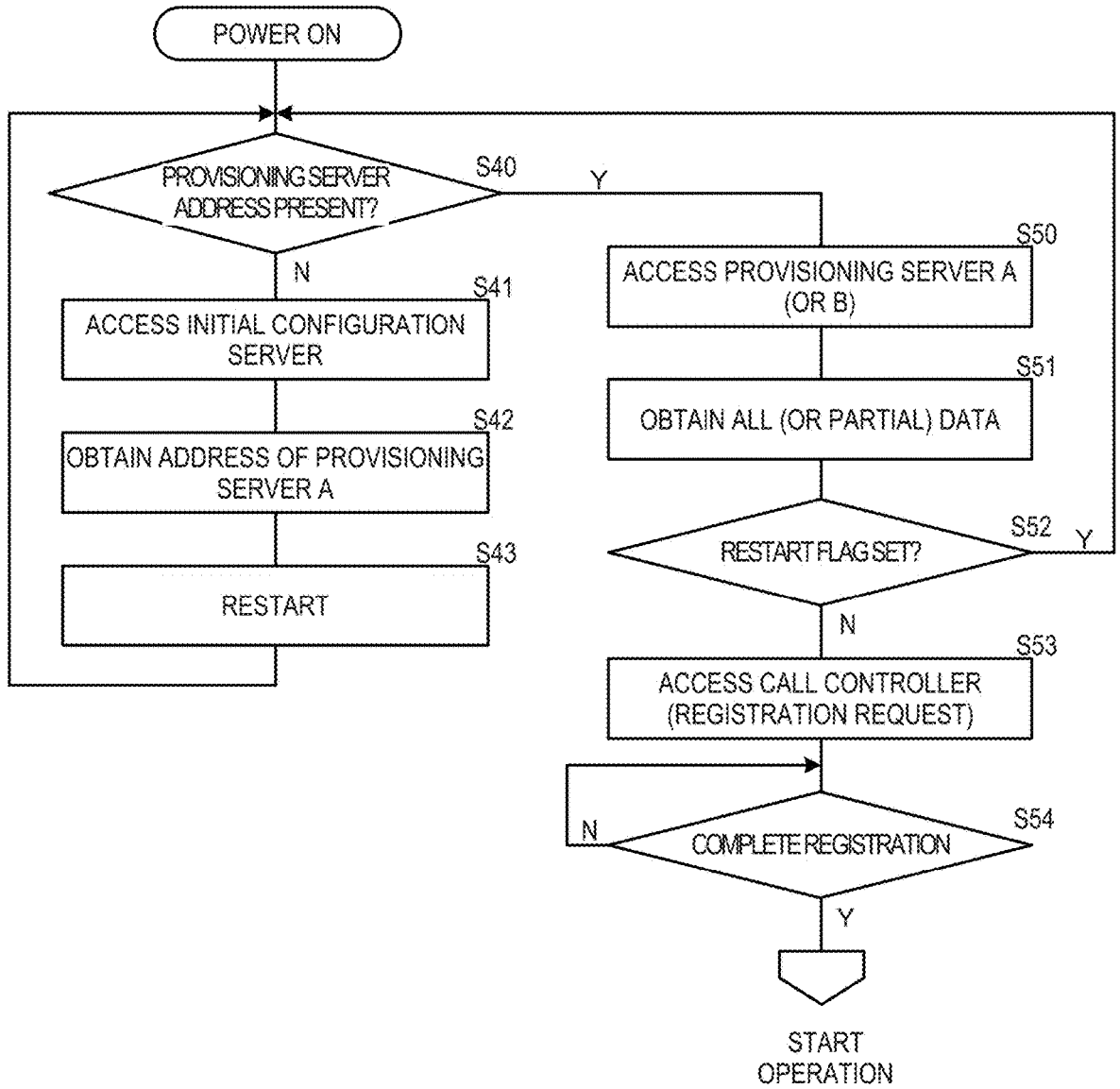
FIG. 12 is a flowchart illustrating an operation of a control unit of the communication terminal.

FIG. 12 is a flowchart illustrating the operation of the control unit 40 of the communication terminal 11 in which the provisioning data is configured by the procedure illustrated in FIG. 11. When power is turned on, the control unit 40 determines whether the address is stored in the provisioning server address storage area of the provisioning data storage area 41A (S40). If the address is not stored therein (NO at S40), it is powered on from the initial state and thus, the control unit 40 controls the LTE communication unit 45 so as to access the address stored in the initial configuration server address storage area (S41). The address of this initial configuration server 12 has been written at shipment from the factory and is not erased even when initialization is performed. The control unit 40 obtains the address of the provisioning server A 14 from the initial configuration server 12 (S42) and writes this address in the provisioning server address storage area. Since the restart flag is set by the initial configuration server 12 in parallel with obtainment of the address, the control unit 40 restarts itself (S43) and returns to S40.

If the provisioning server address has been written at S40 (YES at S40), the control unit 40 controls the LTE communication unit 45 so as to access that address (S50). The control unit 40 obtains the provisioning data from the provisioning server (S51). If the communication terminal 11 accesses the provisioning server A 14 at S50, it obtains all the provisioning data at S51. At this time, the provisioning server address is rewritten into the address of the provisioning server B 15 and moreover, the restart flag is set. If the communication terminal 11 accesses the provisioning server B 15 at S50, a part of the provisioning data is obtained at S51, and the restart flag is not set. That is, restart occurs when the provisioning data obtained from the server is different from the provisioning data stored in its own memory. On the other hand, the provisioning data obtained from the provisioning server B 15 is a part of the provisioning data previously obtained from the provisioning server A 14 and there is no difference and thus, the communication terminal 11 is not restarted.

If the restart flag is set (YES at S52), the control unit 40 restarts itself and returns to S40. If the restart flag is not set (NO at S52), the control unit 40 controls the LTE communication unit 45 so as to access the call controller 16 and requests registration from the call controller 16 (S53). When registration is completed (S54), operation as the communication terminal is started.

In this embodiment, the voice communication system 1 using the LTE network 10 is described, but a network to be used is not limited to the LTE network 10.

The communication terminal 11 corresponds to a terminal device of the present invention. The remote configuration device 17 or the configuration device for the system provider 19 corresponds to the data configuration device of the present invention.

In FIGS. 1 and 4, each server and controller of each of the voice communication systems 1-*n* are described to have separate hardware, respectively, but they may share the hardware. That is, the whole or a part of each server may be a virtual server and in that case, the service may be such that each operates on the same hardware.

REFERENCE NUMERALS

1-*n* voice communication systems 1-*n*
2-*n* call control system
3-2 terminal configuration system
10 LTE network
11 communication terminal
12 initial configuration server
14 provisioning server A
15 provisioning server B
16 call controller
41A provisioning data storage area

What is claimed is:

1. A data configuration system comprising:
a plurality of terminal devices, each of which having a memory for storing configuration data; and
first and second provisioning servers communicable with the terminal devices over a network, wherein
the configuration data are used in the terminal devices to configure a communication among the terminal devices through the network, and are composed with at least three types of data that are common data, individual fixed data and individual variable data wherein
the common data are commonly used by all the terminal devices,
the individual fixed data are individually designed to the terminal devices so that one individual fixed data corresponds to one terminal device, and the individual fixed data is not to be rewritten,
the individual variable data are individually designed to the terminal devices so that one individual variable data corresponds to one terminal device, and only the one terminal device is permitted to rewrite the one individual variable data,
each of the terminal devices has key switches to rewrite the individually variable data in the configuration data,
the first provisioning server stores all the three types of the configuration data,
the second provisioning server stores the individual fixed data designed for the terminal devices and the common data excluding the individual variable data,
one of the terminal devices accesses the first provisioning server in an initial state in order to obtain all the configuration data and store all the configuration data in the memory so that the one of the terminal devices is made to be configured, being defined as a configured terminal device, and
the configured terminal device accesses the second provisioning server in order to obtain the individual fixed data, which is designed for the configured terminal device such that the configured terminal device overwrites the memory with the obtained individual fixed data and the common data.

2. The data configuration system according to claim 1, wherein
the terminal devices access the first or second provisioning server at power on or restart.

3. The data configuration system according to claim 1, wherein
the configured terminal device permits rewriting of the individually variable data by an operation of the key switches after the configured terminal device is configured.

4. The data configuration system according to claim 1, further comprising a data configuration device, wherein
the configuration data stored in the first and second provisioning server is rewritable by the data configuration device.

5. A data update system comprising:
a plurality of provisioning servers (3-1, 3-2) provided in each of the plurality of voice communication systems (1-1, 1-2) such that one provisional server is provided in one voice communication system and another provisional server is provided in a different voice communication system from the one voice communication system; and
a remote configuration device (17) for accessing the provisioning server of any one of the voice communication systems in order to update data on the accessed provisioning server, wherein
an initial configuration server (12) for specifying the provisioning server for the voice communication system to which the remote configuration device should make an access is provided, and
the remote configuration device accesses the initial configuration server at startup and accesses the provisioning server for the voice communication system specified by the initial configuration server.

6. The data update system according to claim 5, wherein
the initial configuration server comprises an allocation table storing an address of the provisioning server to be accessed in association with the remote configuration device, and when the remote configuration device accesses to the initial configuration server, the initial configuration server transmits an address of the corresponding provisioning server to the remote configuration device so as to specify the provisioning server, and
the remote configuration device accesses the provisioning server by using the address received from the initial configuration server.

7. The data update system according to claim 6, wherein
each of the voice communication systems comprises a plurality of provisioning servers, and
the initial configuration server stores the addresses of the plurality of provisioning servers belonging to one voice communication system in association with one remote configuration device.

8. The data update system according to claim 6, wherein
the allocation table is updated by a configuration device for a system provider provided separately from the remote configuration device.

9. A data configuration method, wherein
in a system comprising a plurality of terminal devices, each of which having a memory for storing configuration data and first and second provisioning servers communicable with the terminal devices over a network, the configuration data being used in the terminal devices to configure a communication among the terminal devices through the network, and composed with at least three types of data that are common data, individual fixed data and individual variable data wherein
the common data are commonly used by all the terminal devices, the individual fixed data are individually designed to the terminal devices so that one individual fixed data corresponds to one terminal device, and the individual fixed data is not to be rewritten, the individual variable data are individually designed to the terminal devices so that one individual variable data corresponds to one terminal device, and only the one terminal device is permitted to rewrite the one individual variable data, all three types of the configuration data are stored in the first provisioning server, the individual fixed data is stored in the second provisioning server, the data configuration method, comprising:

causing one of the terminal devices to access the first provisioning server in an initial state in order to obtain all the configuration data so that the one of the terminal devices is made to be configured, being defined as a configured terminal device, and causing the configured terminal device to access the second provisioning server in order to obtain the individual fixed data, which is designed for the configured terminal device and the common data.

10. The data configuration method according to claim 9, wherein the terminal devices are equipped with key switches, and the configured terminal device can rewrite the individual variable data by an operation of the key switches.

11. The data configuration method according to claim 9, wherein the terminal devices access the first or second provisioning server at power on or restart.

12. The data configuration system according to claim 1, wherein the memory is composed with either one of a hard disk and random access memory (RAM) or a combination of the hard disk and RAM.

\* \* \* \* \*